(12) United States Patent
Kveim et al.

(10) Patent No.: US 6,516,023 B1
(45) Date of Patent: Feb. 4, 2003

(54) SYSTEM AND METHOD OF DOWNCONVERSION WHERE THE RECEIVED SIGNAL IS DOWNCONVERTED

(75) Inventors: Tor Kveim, Billingstad (NO); Terje Røste, Åmot (NO)

(73) Assignee: Nera ASA, Billingstad (NO)

( * ) Notice: Subject to any disclaimer, the term of this patent is extended or adjusted under 35 U.S.C. 154(b) by 0 days.

(21) Appl. No.: 09/297,275
(22) PCT Filed: Nov. 6, 1997
(86) PCT No.: PCT/NO97/00292
§ 371 (c)(1), (2), (4) Date: Apr. 28, 1999
(87) PCT Pub. No.: WO98/20623
PCT Pub. Date: May 14, 1998

(30) Foreign Application Priority Data

Nov. 6, 1996 (NO) .......................................... 19964695

(51) Int. Cl.$^7$ ................................................ H04B 1/50
(52) U.S. Cl. .................... 375/219; 375/285; 375/297; 375/350; 455/83; 455/84; 370/278; 370/282
(58) Field of Search ................................. 375/285, 219, 375/220, 222, 221, 259, 316, 297, 350; 455/73, 83, 84; 370/278, 282

(56) References Cited

U.S. PATENT DOCUMENTS 5,422,909 A * 6/1995 Love et al. ................ 375/147
5,493,701 A    2/1996 Makinen
6,055,281 A *  4/2000 Hendrickson et al. ...... 329/304

FOREIGN PATENT DOCUMENTS

| EP | 0 171 997 | 2/1986 |
| GB | 2 228 378 | 8/1990 |
| GB | 2 228 379 | 8/1990 |

* cited by examiner

*Primary Examiner*—Amanda T. Le
(74) *Attorney, Agent, or Firm*—Young & Thompson (57) ABSTRACT

A system and method for simultaneous transmission and receival where the received signal is downconverted in a downconverting unit by using a portion of the transmitted modulated signal as LO for the downconversion. The downconversion is performed to an intermediate frequency signal having a frequency equal to the difference between the frequency of the transmitted signal and the frequency of the received signal. There is provided a common antenna for transmitting and receiving, and a duplex filter in front of the antenna to separate the transmitted signal and the received signal with the transmitter data on the transmitter side having been applied to a modulator. In front of the duplex filter on the transmitter side is provided a power amplifier. On the receiver side there is, in addition, provided a demodulator to permit withdrawal of user data for the user on the receiver side. Compensation for the modulation introduced by the signal in the downconversion unit is provided in the receiver by a device where the transmitted phase is used as a reference, delayed in a time delay unit by an appropriate delay, and where this delay unit may be estimated and updated in order to compensate for variable delay in the outer signal path.

16 Claims, 6 Drawing Sheets

SYSTEM AND METHOD OF DOWNCONVERSION WHERE THE RECEIVED SIGNAL IS DOWNCONVERTED

BACKGROUND OF THE INVENTION

The present invention relates to a system for wireless data transmitters and receivers of the type disclosed below, and to a method for downconversion using the modulated signal on the transmitter side.

More specifically, the present invention relates to wireless data transmitters and receivers, where transmission and reception occur at the same time, but at different frequencies, i.e., FDM (frequency division multiplex) to achieve full duplex data communication.

DESCRIPTION OF THE RELATED ART

In systems for wireless (radio) data communication there are mechanisms for allocation of frequency slots for the transmission and receiver channels. This access mechanism is denoted FDMA (frequency division multiple access). In some systems there is a constant difference in the carrier frequency between a transmitted and received signal. One example of such a system is Inmarsat Standard M. In this case, it is sufficient to have one frequency synthesizer which is capable of serving both the transmitter and the receiver. By using this system cost savings may be achieved.

SUMMARY OF THE INVENTION

According to the present invention, further savings are possible if the transmitted signal itself is used for downconversion of the received signal.

Furthermore, it is an objective of the invention to connect it to modulation methods of the constant envelope type, such as CPM (continuous phase modulation), DPM (digital phase modulation) or near constant envelope modulation such as, e.g., the OQPSK type (offset quadrature phase shift keying).

In U.S. Pat. No. 5,444,737 only FM modulation or FSK modulation is described. The present invention is more general and is capable of modelling all types of constant envelope modulation methods which may be described as either digital phase modulation (DPM) or digital frequency modulation (CPM). The present invention may be used for the OQPSK modulation method (offset quadrature amplitude modulation): filtered OQPSK is, at the outset, not constant envelope modulation, but by elimination of the amplitude portion (hardlimiting) in the transmitter, the transmitted signal will become a constant envelope signal. This means that the amplitude variation is eliminated. OQPSK has the characteristic that the losses associated with such hardlimiting are negligible. With the present invention there are described all modulation methods which either per se possess constant envelope or where constant envelope is provided by hardlimiting in the transmitter either by digital signal processing where the amplitude portion is suppressed, or by a hardlimiting output amplifier (HPA).

In the aforementioned US patent an analog data signal is used which is taken from the transmitter section and which is subtracted from the received signal after a frequency discriminator and an appropriate analog delay.

With the present invention it is not necessary to use a frequency discriminator, but the phase portion (the amplitude is neglected) of the transmitted signal is derived directly from the transmitter signal, then sign inverting is carried out, and from this is formed by exponentiation a complex equivalent baseband signal. By multiplying the received complex equivalent baseband signal in the receiver by the complex equivalent baseband signal for the aforementioned derivative of the transmitted signal, there will be compensation for the unwanted phase perturbation which occurs as a result of downconversion with the modulated transmitted signal used as a local oscillator derived from the transmission signal.

In the aforementioned US patent there is used an analog embodiment which can prove to be rather impractical. The present invention prescribes a fully digital embodiment by use of, e.g., a DSP (digital signal processor).

In the US patent a fixed delay is utilized in an analog execution with RC elements to compensate for the delay in the TX/LO loop. This is not very practical, and with the present invention this is carried out digitally with the aid of a digital Lagrange interpolating filter. Using an LMS algorithm (LMS=least mean square) the delay is either calculated during the production phase, thereafter being set as a fixed value in the radio transceiver, or the delay may be calculated continuously during operation of the radio transceiver with the same as algorithm (adaptive algorithm). In the first case, the LMS algorithm is a part of the production set-up, and in the latter case this algorithm is a part of the radio equipment. This method provides for increased flexibility and a considerably more accurate compensation of the modulation of the signal derived from the transmitter in the event of component variations, temperature drift and aging which may occur in the outer signal path, in contrast to what is previously known.

The aforementioned effects are brought about with the aid of a system of the type introduced above, the characteristic features of which are set forth below, and a method of the type introduced above, the characteristic features of which are set forth below.

BRIEF DESCRIPTION OF THE DRAWINGS

The invention will be described in more detail in the following, with reference to the drawings wherein.

DESCRIPTION OF THE PREFERRED EMBODIMENTS

Figure 1:
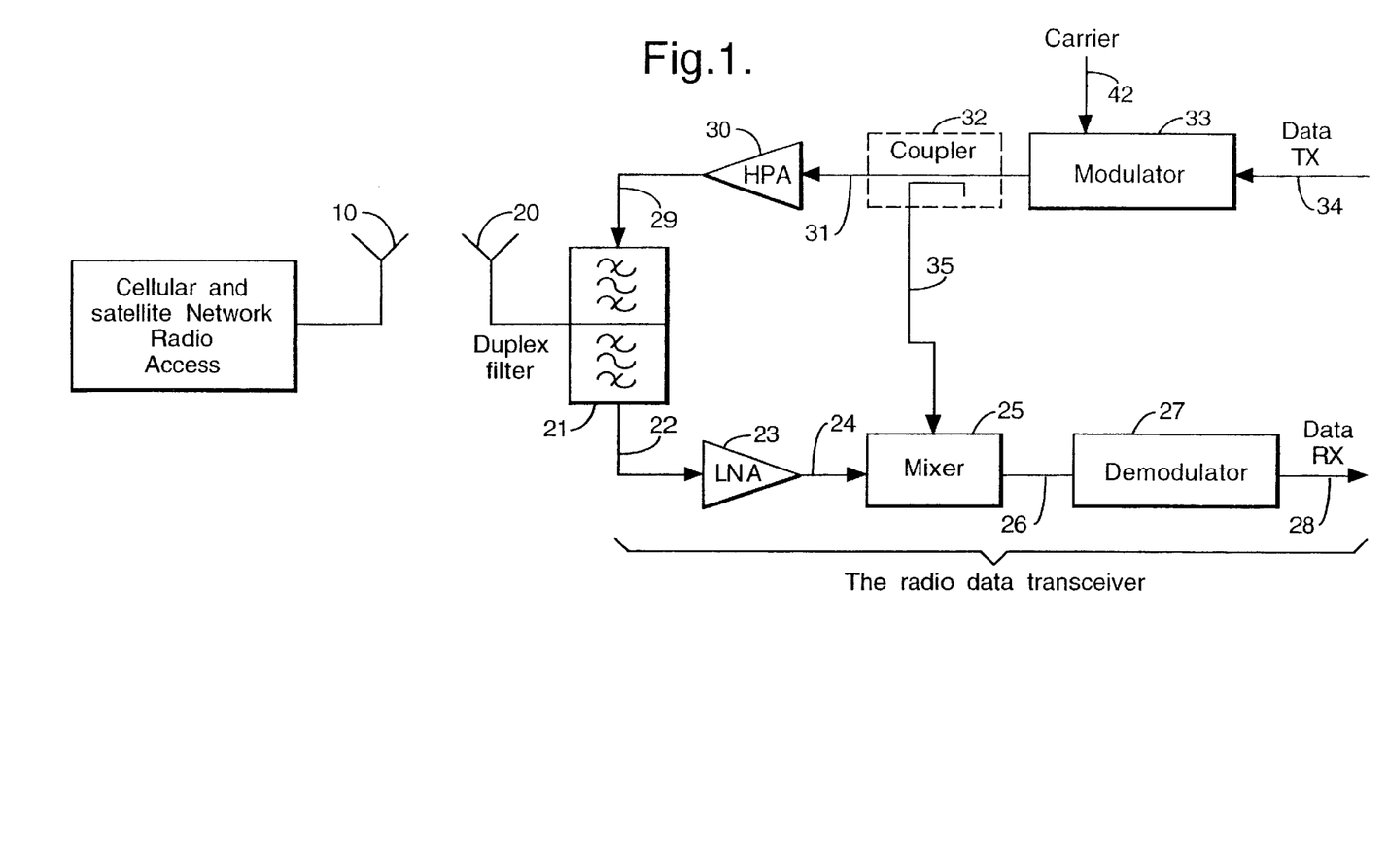
FIG. 1 is a block diagram of a point to multipoint full duplex radio communication system.

The radio transceiver, shown to the right in the block diagram in FIG. 1, uses a common antenna 20 to transmit (TX) and to receive (RX). The carrier frequency of the transmitted signal is controlled digitally by a reference signal 37 fed into a phase locked loop (PLL) 36, via a digital-to-analog converter (DAC) and a device for direct digital frequency synthesis (DDS) 40, cf. FIG. 2. By adding a data signal 46b, the latter derived in the preceding differentiator 44, to a reference frequency 42, the data sequence will yield a modulated signal at the output of the modulator 33, cf. FIG. 1.

Figure 2:
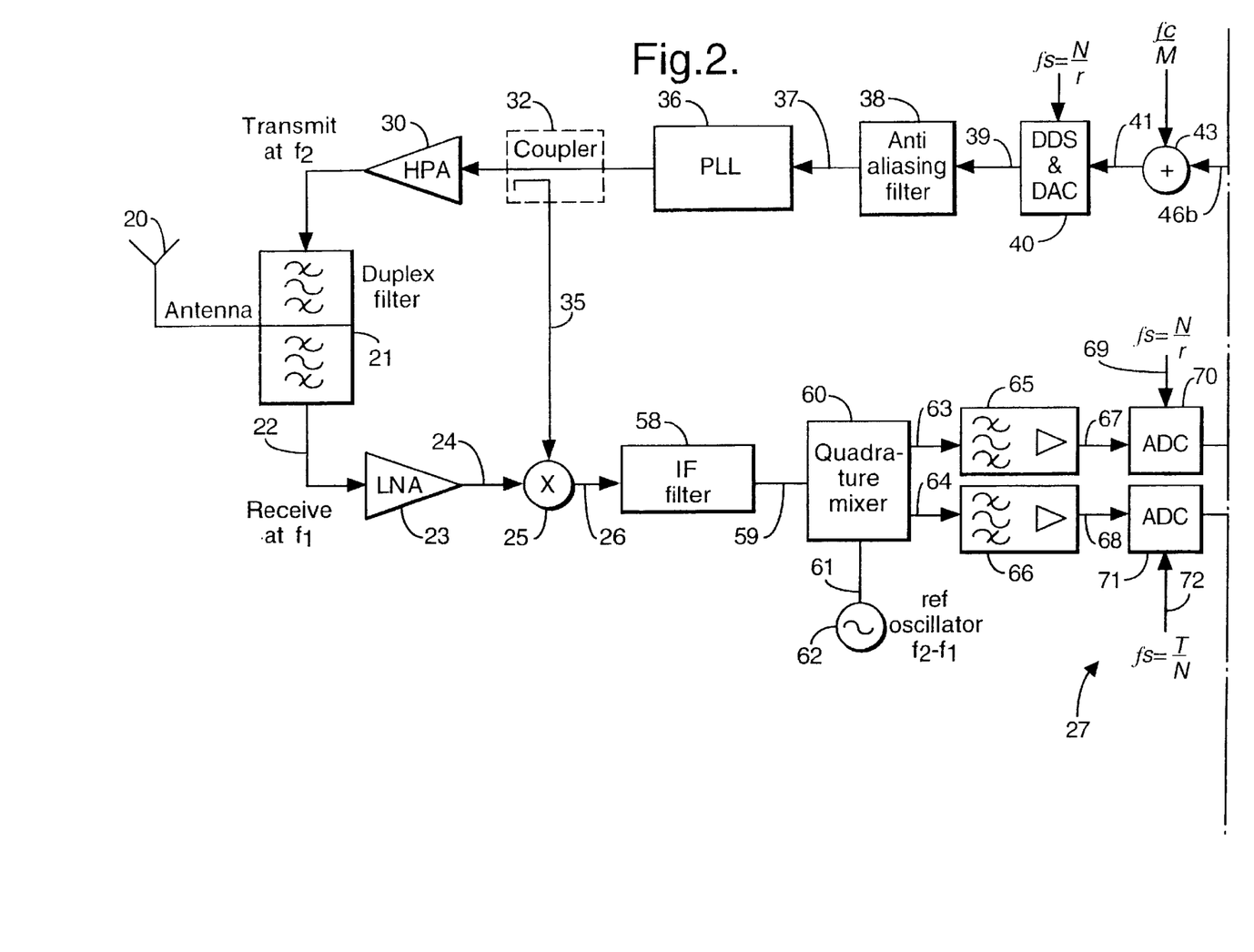
FIG. 2 is a detailed block diagram of the system in accordance with the present invention.

With the aid of a coupler 32, a suitable portion 35 of the transmitted signal can be used as a local oscillator (LO) for the receiver signal 22. The receiver signal is downconverted to an intermediate frequency (IF), which is the difference between the transmitter's carrier wave frequency $f_2$ and the incoming signal's carrier wave frequency $f_1$. The phase of the received IF signal 26 is perturbed by the modulation in the transmitted signal. Compensation for this perturbation is achieved by using the transmitter's baseband signal 46a. The latter signal is converted to a complex vector representation 81 by exponentiation 82, followed by multiplication 80 of this complex vector by the incoming signal's complex equivalent baseband representation 76. Both the phase 46a of the transmitter signal and the receiver signal 76 are represented digitally, and the compensation is performed fully digitally.

By the term "the outer signal path" is meant the signal path from the transmitter through the transmitter's PLL 36, the coupler 32, the downconverter 25 and the demodulator 27, cf. FIG. 1 and FIG. 2. By the term "the inner signal path" is meant the signal path through the variable delay 53, the sign inverter 86 and the unit which implements the exponentiation 82. Owing to delay and filtering in the outer signal path, appropriate delay 53 must be introduced in the compensation branch in order to eliminate completely the aforementioned phase error introduced by the transmitted signal employed as LO. The delay in the outer signal path is variable as a result of spread in the component data, aging and temperature drift. A continuous estimation of this delay and correspondingly an adjustment of the delay in the delay unit 53 of the inner signal path will therefore improve the performance of the receiver considerably. The present invention describes two alternative methods of implementing this delay. In the first alternative, the delay is estimated and adjusted during the production phase in order to hold a fixed value thereafter, and in the second alternative the delay is estimated and adjusted continuously during use. There are also prescribed two alternatives for downconversion. In the first alternative the difference between the transmitter and receiver frequency comprises the intermediate frequency for the receiver. In the second alternative the portion of the transmitter signal 35 which is used as the receiver's LO will first be downconverted at a frequency corresponding to the difference between the frequencies $f_2$ and $f_1$. After filtering out the lower sideband of the mixer product which emerges after the first downconversion, the latter mixer product is used as LO for a quadrature demodulator 60 for direct downconversion of the received signal 24 to a baseband signal given by the signals 63 and 64.

The present invention is applicable both for point to point communication and for point to multipoint communication, such as data communication between a user terminal and a base station in a mobile cellular system or a land earth station (LES) in a satellite communication system.

The invention will be described in more detail below with reference to the figures, wherein FIG. 1, as mentioned above, shows a radio communication system for full duplex radio communication. Here there is shown a point to multipoint system common in most mobile communication systems. In an earthbound, cellular system, this means communication between the base stations and several terminals. In FIG. 1 only one terminal is shown. In satellite communication point to multipoint communication means communication between a satellite earth station (LES=land earth station) via one or more satellites to a plurality of satellite terminals.

A common antenna 20 is used for both transmission and receival. A duplex filter 21 in front of the antenna separates the transmitted signal 29 from the received signal 22, cf. FIG. 1. On the transmitter side the transmitted data 34 are applied to a modulator 33. The coupler 32 couples a portion 35 of the modulated transmitter signal 31 to the receiver's downconversion unit, mixer 25. Transmitter signal 31 is also sent further to the output amplifier (HPA) 30 in front of duplex filter 21. On the receiver side a low noise amplifier (LNA) 23 amplifies the incoming signal, whereafter this signal is downconverted to an intermediate frequency as explained above. The intermediate frequency, as mentioned previously, is equal to the difference between the transmitted carrier wave frequency $f_2$ and the received carrier wave frequency $f_1$. After the demodulator 27, the received data 28 appear.

FIG. 2 shows a detailed block diagram of the invention. The description of this block diagram follows the signal path of the transmitted data from the input 34 to the antenna 20, including the signal processing on the transmitter side, and the received signal from the antenna 20 to the received data 28, including the signal processing in the receiver section.

The transmitted data 34 are converted to a complex signal 51 in a real to complex converter 52. In the case of 4 PSK modulation, this means that the incoming bit is alternately applied to the real part and the imaginary part. To obtain an oversampling factor N of the transmitted data signal, an interpolation filter 50 is provided. The transmitted signals are then given an appropriate pulse shape in a pulse shaping filter 48. In order to form a constant envelope signal from the filtered transmitter signal 47, the argument operator 45 takes the argument (the phase) $\phi(iT/N)$ 46a (i is the count variable for time, T/N is the difference in time between consequtive samples) for the complex signal 47. The phase signal $\phi(iT/N)$ 46a is essential for the present invention. As is apparent from the block diagrams in FIG. 1 and FIG. 2, this signal is used to compensate for the previously mentioned phase error introduced by signal 35 during the downconversion in mixer 25. After the argument operator 45 (block diagram in FIG. 2), the signal is differentiated in 44 so that the instantaneous frequency deviation from a carrier wave 46b emerges. To this frequency deviation is added the frequency $f_c/M$ of the carrier wave. M emerges as a result of the fact that an upmultiplication of the frequency corresponding to M is carried out in the following phase locked loop (PLL) 36. The resultant frequency signal 41 is then applied to a DDS (direct digital synthesizer) 40 and a DAC (digital to analog converter) 40 and to a "smoothing" or anti-aliasing filter 38, which generates an analog phase modulated signal 37 as a reference signal for the upmultiplying VCO-controlled phase locked loop 36 (VCO=voltage controlled oscillator). The end processing of the signal in the radio section and the receival further on to the IF filter 58 is described above and will not be repeated here.

The further signal processing in the demodulator is described in the following. The output from the IF filter 58 is downconverted in a quadrature mixer which separates the cosine and sine part 63 and 64 of the received signal. After necessary filtering and amplification 65 and 66, the two components are converted 70 and 71 to digitally represented signals 73 and 74. The conversion rate N/T is the same as in the transmitter unit. The cosine part is converted to the real part and the sine part is made the imaginary part in the following unit 75, yielding a complex equivalent baseband signal 76. The latter signal is multiplied in the multiplier 80 by the previously mentioned complex compensation signal 81, and this constitutes the core of the invention. This multiplication implements a phase correction consisting of three components:

a) phase error for the received signal 79 b) frequency error for the received signal c) compensation for phase error introduced when portion 35 of the transmitted signal is used as LO for downconversion.

As indicated in FIG. 2 estimation of phase and frequency error is implemented with the aid of decision directed techniques, which are known per se techniques, but the present invention combines the aforementioned compensation with correction of phase-frequency error in a simple and effective manner.

In the following is a description of the compensation mentioned in c) above. The reference for the compensation is taken from the transmitters phase signal 46a. This signal ϕ(iT/N) is delayed in a variable delay unit 53. The delay is estimated by using a derivation of the well-known LMS algorithm, a derivation developed particularly for this purpose. The estimated delay is denoted by $\hat{\tau}$ and is an estimate of the delay in the outer signal path. The delay unit is implemented as Lagrange interpolator, cf. FIG. 4. The Lagrange in terpolator enables realization of an arbitrary delay for a time discrete (sampled) signal. The delayed signal may be expressed by the equation:

$$\hat{\phi}\left(i\frac{T}{N}\right) = \phi\left(i\frac{T}{N} - \hat{\tau}\right)$$

This signal is sign inverted 86 and added to the phase and frequency error signals 79 to form the composite phase correction signal $$\varsigma\left(i\frac{T}{N}\right)$$

83 before the latter is calculated by exponentiation 82 and multiplied by the incoming baseband signal 76. In order to minimize white noise and intersymbol interference, an appropriate signal matched filter 88 is inserted in front of the detection unit 90.

The LSM algorithm uses:

a) an error signal 57 from the detection unit 90, b) the input signal 87 to the matched filter 88, c) the output signal 54 from the variable delay unit 53 in order to make an update 53a of estimated delay $\hat{\tau}$.

Figure 3:
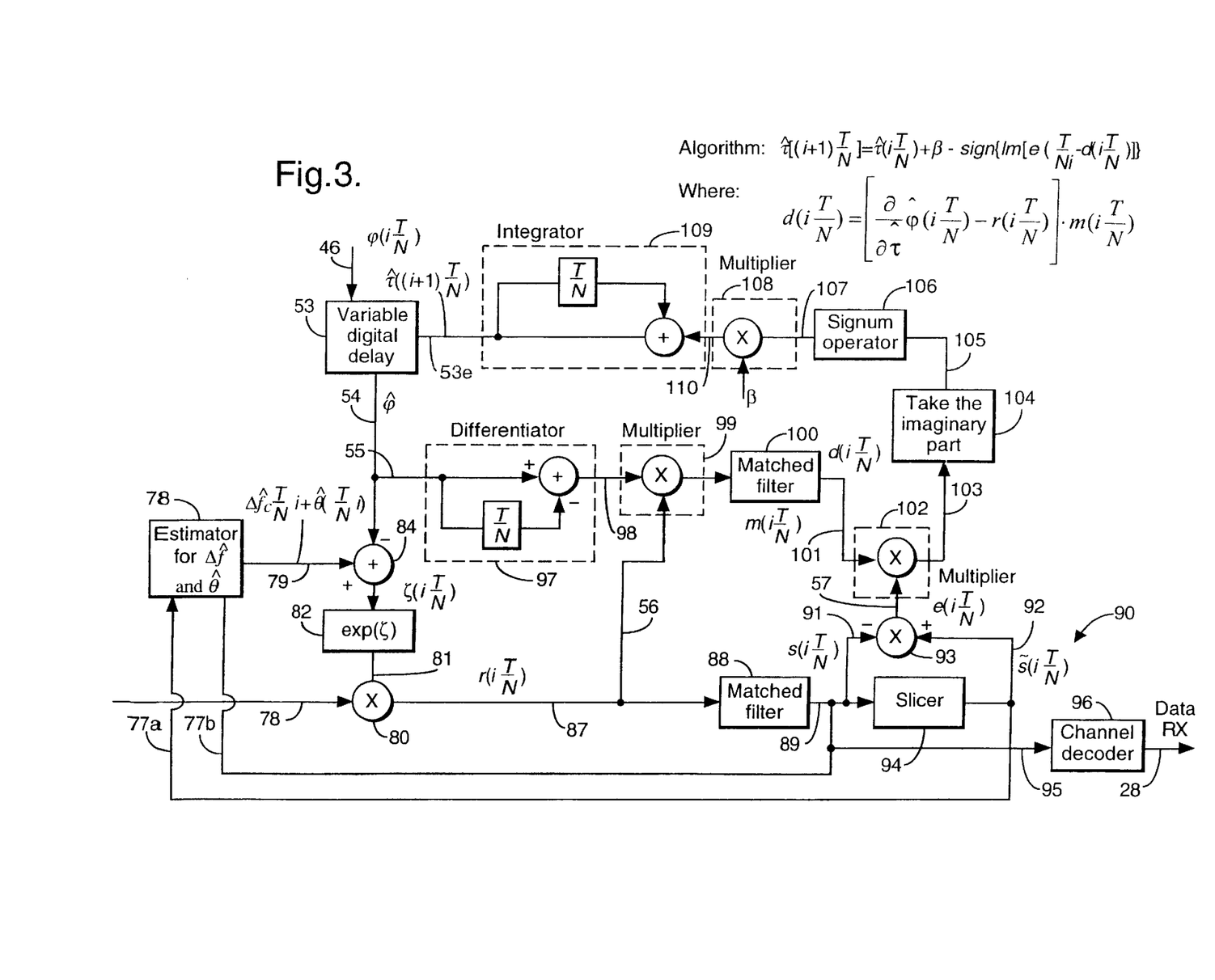
FIG. 3 shows the LMS update of the delay.

In the following the LMS algorithm is described with reference to the block diagram in FIG. 3, and the description assumes a fully digital implementation of the algorithm using, e.g., a DSP (digital signal processor).

The estimate of the delay $\hat{\tau}$ at time (i+1)T/N is based on an earlier estimate of $\hat{\tau}$ at time iT/N according to the algorithm $$\hat{\tau}\left[(i+1)\frac{T}{N}\right] = \hat{\tau}\left(i\frac{T}{N}\right) - \frac{1}{2}\beta\nabla\left(i\frac{T}{N}\right) \quad (1)$$

where β is the update constant and $\overline{\nabla}$(iT/N) is the gradient with respect to $\hat{\tau}$ defined by $$\nabla\left(i\frac{T}{N}\right) = \frac{\partial J\left(i\frac{T}{N}\right)}{\partial \hat{\tau}\left(i\frac{T}{N}\right)} \quad (2)$$

where J is the mean square error at time iT/N. In the following iT/N is replaced by i in order to simplify the terminology in the further description. By using the equations (1) and (2), it can be shown that the update algorithm will be $$\hat{\tau}(i+1) = \hat{\tau}(i) + \beta \text{sign}\{\text{image}[e(i) \cdot d(i)]\} \quad (3)$$

where $$d(i) = \left[\frac{\partial \hat{\phi}(i)}{\partial t} \cdot r(i)\right] * m(i) \quad (4)$$

Figure 4:
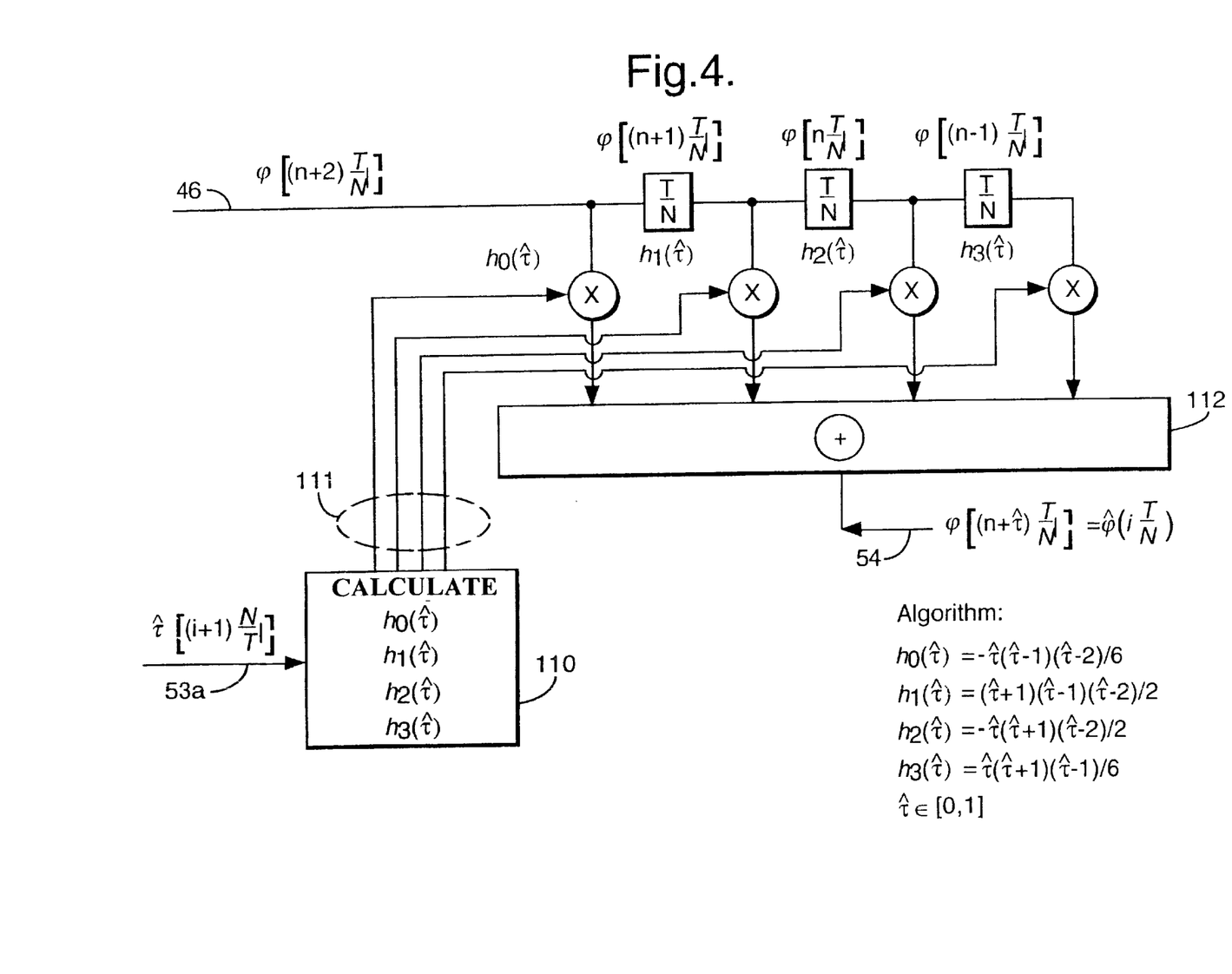
FIG. 4 shows the Lagrange interpolator.

In equation (4) the operator * denotes convolution. For the further description, the following signals are defined as indicated below:

$\hat{\tau}(i)$ the estimate of the delay 111 at time i (cf. FIG. 4)

$\hat{\tau}$(i+1) the updated estimate 53a of the delay at time i+1 e(i) the error signal 57 at the output of the detection unit d(i) the output signal 101 from the signal matched filter 100 r(i) the received signal 56 at the input to the multiplier 99

$\hat{\phi}$(i) the estimated phase 54 at the output of the variable delay unit 53 m(i) the impulse response of the matched filters 88 and 100

The output signal $\hat{\phi}$(i) 54 from the variable delay unit 53 is differentiated in the differentiator 97, the output signal 98 is then multiplied by the received signal r(i) 56, and the result is convolved with the matched filter 100 with impulse response m(i). The output d(i) 101 from the matched filter 100 is then multiplied 102 by the error signal e(i) 57, and the imaginary part 104 is taken therefrom. The result 103 is an estimate of the gradient. A simplification of the LMS algorithm is the use of the sign for the gradient 106 which forms still another estimate of the gradient 107 when this is multiplied by an appropriate update constant β. The integrator 109 thus yields an updated value of the estimated delay in the delay unit 53.

As described above, the present invention utilizes a derivation of the LMS algorithm developed particularly for this purpose. With the present invention it is thus possible to adjust for delay variations in the outer signal path.

The variable delay is obtained using a fourth order Lagrange interpolator realized as an FIR (finite impulse response) filter where the taps $h_0$, $h_1$, $h_2$, $h_3$ in the filter are calculated for each update according to the algorithm displayed in FIG. 4.

Figure 5:
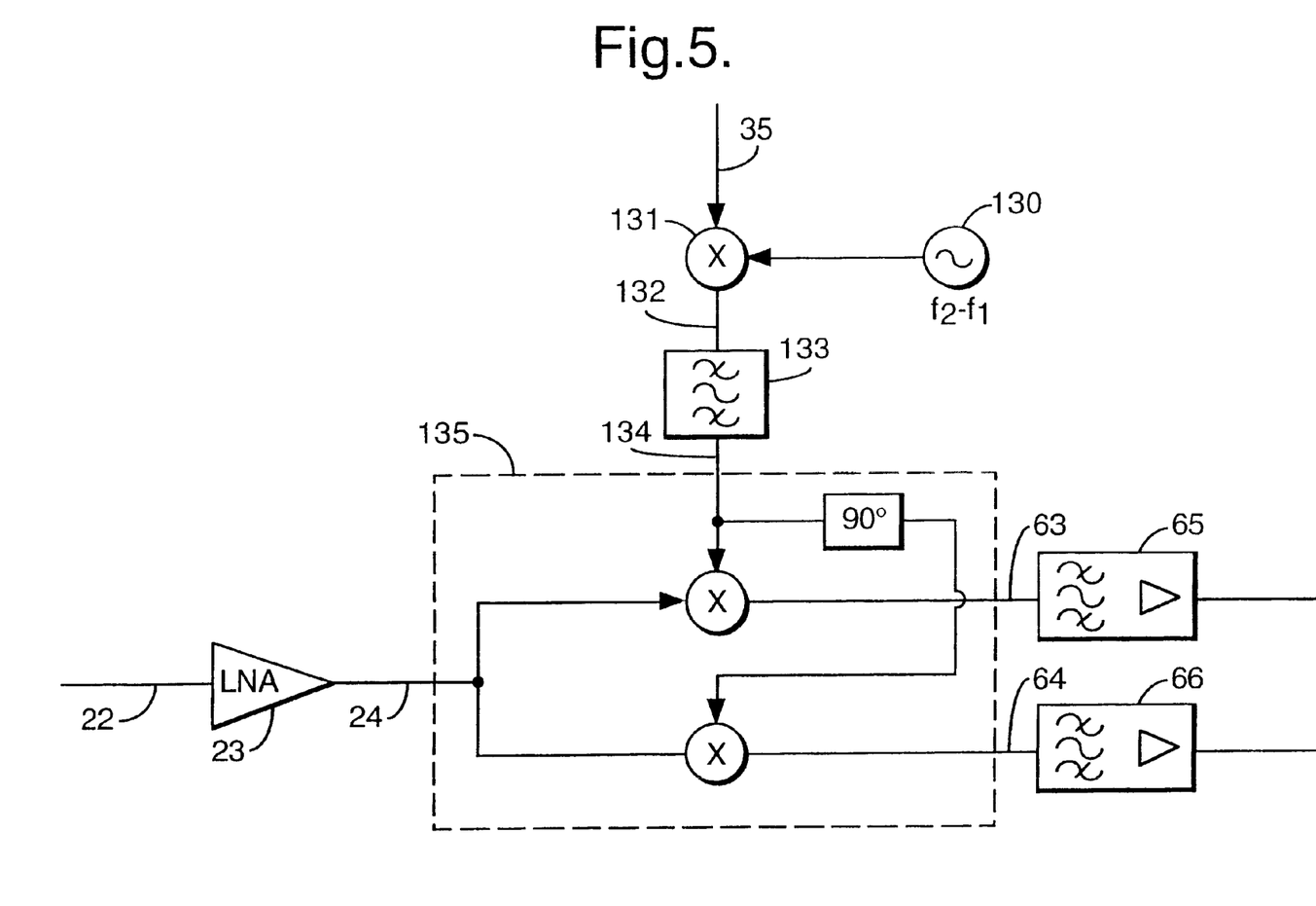
FIG. 5 shows an alternative downconversion structure.

The present invention may be utilized in an alternative downconversion structure described in the introduction, where the intermediate frequency stage is omitted and direct conversion to baseband takes place, as shown in FIG. 5.

What is claimed is:

1. A system for simultaneous transmission and reception where a received signal is downconverted, by using a transmitted signal (35), employed as a local oscillator (LO), characterized in that a digital signal processor (DSP) is provided which compensates for unwanted modulation in the transmitted signal (35) used for downconversion, that a digital complex baseband reference signal (46a) is used for elimination of the unwanted modulation in the transmitted signal where a part (35) of the transmitted signal is employed as the local oscillator (LO), said elimination being performed digitally with the aid of a digital signal processing algorithm in complex baseband, and that there is provided a multiplier (80) for said elimination, there being carried out an inverse operation of the multiplication in the multiplier (25) which relates to every kind of phase and/or frequency modulation in the local oscillator (LO) to which the received signal (24) is applied.

2. The system according to claim 1, characterized in that for the downconversion there may be provided devices for downconversion in two stages, first at a frequency equal to the difference ($f_2-f_1$) between transmitted and received carrier waves, and then a second stage where the received signal is downconverted directly to baseband with the aid of a quadrature downconverter.

3. The system according to claims 1, characterized in that a digital signal processor (DSP) is provided for compensation of the unwanted modulation with the aid of digital signal processing algorithms.

4. The system according to claims 1, characterized in that for elimination of said unwanted modulation in the LO signal (35) there is provided a delay unit (53), which delays the reference phase signal (46a), which is represented digitally and time discretely, a sign inverter (86) where the signal is sign inverted and added to a correction signal for phase and frequency error in the received signal, an exponentiation unit (82) where the resultant signal is exponentiated and a multiplier wherein a multiplication by an incoming received baseband signal (76) is carried out.

5. The system according to claims 1, characterized in that the delay is given an arbitrary resolution by digital calculation with the aid of a known per se Lagrange interpolation algorithm.

6. The system according to claims 1, characterized in that for estimation of optimal time delay (53) there is utilized a special mathematical derivation of the known per se LMS algorithm developed particularly for this purpose.

7. The system according to claims 1, characterized in that for deriving the LMS algorithm for an updated delay (53a) the time derivative for the delayed phase (54 and 55) is obtained in a digital differentiator (97) and the output signal (98) is multiplied in a multiplier (99) by the received baseband signal (87 and 56), filtered in a matched filter (100), multiplied by an error signal (57) derived from a detection unit (94), followed by taking the imaginary part (104) and the sign (106) thereof, multiplied by an appropriate constant in a multiplier (108), in order to find an update of the delay, which integration (109) yields an updated delay (53a).

8. The system according to claims 1, characterized in that the LMS algorithm for estimation of optimal delay is applied either by training of the algorithm in the course of the production test, with the delay being fixed thereafter, whereby the LMS algorithm for estimation of optimal delay is formed as a part of the test equipment, or the algorithm is trained by using real data in operation of the radio transceiver, in which case the LMS algorithm is a part of the radio transceiver.

9. A method for simultaneous transmission and reception where a received signal is downconverted, using a transmitted signal (35), employed as a local oscillator (LO), characterized in that a digital signal processor (DSP) compensates for unwanted modulation in the transmitted signal (35) used for downconversion, that a digital complex baseband reference signal (46a) is used for elimination of the unwanted modulation in the transmitted signal where a part of the transmitted signal is employed as the local oscillator (LO), said elimination being performed digitally with the aid of a digital signal processing algorithm in complex baseband, and that a multiplier (80) provides for said elimination, there being carried out an inverse operation of the multiplication in the multiplier (25) which relates to every kind of phase and/or frequency modulation in the local oscillator (LO) to which the received signal (24) is applied.

10. The method according to claim 9, characterized in that a downconversion is carried out in two stages, first at a frequency equal to the difference ($f_2-f_1$) between transmitted and received carrier wave, and then a second stage where the received signal is downconverted directly to baseband with the aid of a quadrature downconverter.

11. The method according to claims 9, characterized in that a digital signal processor (DSP) compensates for the unwanted modulation with the aid of digital signal processing algorithms.

12. The method according to claims 9, characterized in that said unwanted modulation in the LO signal (35) is eliminated in that the reference phase signal (46a), which is represented digitally and time discretely, is delayed in a delay unit (53), sign inverted in a sign inverter (86) where the sign inverted signal (85) is added to a correction signal for phase and frequency error in the received baseband signal, the resultant signal (35) is exponentiated in an exponentiation unit (82) and multiplied in a multiplier by the incoming received baseband signal (76).

13. The method according to claims 9, characterized in that the delay is given an arbitrary resolution by digital calculation with the aid of a known per se Lagrange interpolation algorithm.

14. The method according to claims 9, characterized in that to estimate optimal time delay (53), a special derivation of the known per se LMS algorithm developed for this purpose is used.

15. The method according to claims 9, characterized in that for developing the LMS algorithm for updated delay (53a), the time derivative for the delayed phase (54 and 55) is obtained in a digital differentiator (97) and the output signal (98) is multiplied in a multiplier (99) by the received baseband signal (87 and 56), filtered in a matched filter (100), multiplied by an error signal (57) derived from a detection unit (94), followed by taking the imaginary part (104) and the sign (106) thereof, multipled by an appropriate constant in a multiplier (108), in order to find an update of the delay, which integration (109) yields an updated delay (53a).

16. The method according to claims 9, characterized in that for the modulation, there is employed an angle modulation, either frequency modulation, or phase modulation, or any other modulation where the amplitude variations have been suppressed by applying the argument operation (45).

* * * * *